United States Patent Office 3,505,431
Patented Apr. 7, 1970

3,505,431
HYDROXYALKYL PHOSPHORUS COMPOUNDS
AND PROCESS FOR MAKING SAME
Gail H. Birum, Kirkwood, Mo., assignor to Monsanto Company, St. Louis, Mo., a corporation of Delaware
No Drawing. Filed Nov. 1, 1965, Ser. No. 505,988
Int. Cl. C07f 9/28
U.S. Cl. 260—932
12 Claims

ABSTRACT OF THE DISCLOSURE

Hydroxyalkyl-aminoalkyl-pentavalent phosphorus compounds of the formula

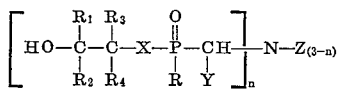

wherein each of $R_1$, $R_2$, $R_3$ and $R_4$ is a member of the group consisting of hydrogen, alkyl and haloalkyl radicals having 1 to about 6 carbon atoms, phenyl with not more than one of the substituents being phenyl; R is selected from the group consisting of alkyl, alkyloxy and haloalkyloxy radicals having from 1 to 10 carbon atoms, monocyclic aryl hydrocarbon and hydrocarbonoxy radicals having from 6 to about 10 carbon atoms and said aryl hydrocarbon and hydrocarbonoxy radicals having halogen substituents therein; X is selected from the group consisting of —O—, —S—, —$CH_2$—, and $R_5CH<$ wherein $R_5$ denotes an alkyl radical having from 1 to 2 carbon atoms; Y is selected from the group consisting of hydrogen, alkyl having from 1 to 10 carbon atoms, cycloalkyl having from 3 to 6 carbon atoms, furyl and thienyl; and Z is selected from the group consisting of hydrogen, alkyl having from 1 to 10 carbon atoms, hydroxyalkyl having from 2 to 10 carbon atoms, phenyl, with only one Z being phenyl, the other being hydrogen, and with two Z radicals taken together with the nitrogen atom to which they are bonded containing from 2 to 5 methylene carbon atoms completing a ring therewith.

These compounds are prepared by reacting (a) ammonia, primary or secondary monoamine with (b) an aldehyde, and (c) a trivalent phospholane ester.

These compounds have flame retardant properties.

This invention relates to new organic compounds containing nitrogen and phosphorus and to a process for preparing them. More specifically, this invention provides a process for preparing new (hydroxyalkyl)aminoalkyl phosphonate and phosphinate esters and phosphine oxides.

It is known that dialkyl (dialkamino)alkylphosphonate esters are obtained by reaction of dialkyl hydrogenphosphonate esters, aldehydes or ketones, and dialkylamines. Water is generated as a by-product as disclosed in U.S. Patent 2,635,112. An additional operation, such as distillation, is needed to separate them from the water. U.S. Patent 2,847,442 discloses a similar process involving the use of asymmetrical dialkyl phosphorus esters. Similarly, U.S. Patent 3,076,010 claims bis(hydroxyalkyl)aminoalkylphosphonic acid diesters where the ester groups are alkyl or haloalkyl. These compounds are made by the process outlined above in which water is generated as a by-product and which must be removed if a substantially pure or dry product is desired. The water removal step adds to the cost of the process. Also, for some applications, it is desirable to provide products having hydroxyl groups in radicals bonded to phosphorus and as much flame retarding value as is economically feasible. Such flame retarding chemicals may be those containing chlorine, bromine, phosphorus and nitrogen.

By this invention I am providing a method for obtaining new chemical products of flame retardant value which contain at least two and as many as all four of these elements in one compound while also providing hydroxyalkyl groups which permit these products to be cross-linked or built into organic polyester and polyurethane resin and foam systems. A unique feature of this method is consumption of the water of reaction in the generation of beneficial alcoholic hydroxyl groups while producing a substantially water-free product.

The objects of this invention can be exemplified by the following: (1) To provide a process for preparing aminoalkyl pentavalent phosphorus compounds while providing for the consumption of generated water of reaction so that the final product is substantially free of water without drying. (2) To provide for the in situ generation of reactive hydroxyalkyl groups in the aminoalkyl pentavalent phosphorus compound products, and (3) to provide a new group of reactive aminoalkyl pentavalent phosphorus compounds. Other objects, aspects, and purposes of the invention will become apparent from the description given hereinbelow.

Briefly, the objects of this invention are accomplished by reaction of (1) ammonia or a primary or secondary monoamine, (2) an aldehyde, and (3) a cyclic trivalent phospholane ester to obtain an aminoalkyl pentavalent phosphorus ester containing at least one alcoholic hydroxyl group. By suitable choice of the three reactants, products of any desirable molecular weight can be prepared. For most flame-retardant applications it is usually desirable to keep the molecular weight relatively low. It is thus preferred that any primary or secondary amine that is used contain in addition to the nitrogen a total of up to about 20 carbon atoms, the aldehyde contain from 1 to about 10 carbon atoms, and the trivalent phospholane ester have from 2 to a total of about 10 carbon atoms in the alkylene group of the ester ring thereof, and from 1 to 10 carbon atoms in a hydrocarbyl, hydrocarbyloxy, halogen-substituted hydrocarbyl or halo-hydrocarbyloxy radical bonded to the phosphorus atom thereof to obtain as reaction product a relatively low molecular weight, substantially dry (hydroxyalkyl)(aminoalkyl) pentavalent phosphorus compound. These products are particularly useful as such for incorporation into various resinous and foamed polymer systems such as polyesters, polyurethanes, acrylate polymers such as polymethylmethacrylate, olefin-maleic anhydride foams and resins, epoxy resins, acrylonitrile and methacrylonitrile homopolymer and copolymer systems for use therein as flame-retarding components. Compounds of this invention retaining free hydrogen bonded to nitrogen, as when ammonia is used with only equimolar proportions of aldehyde and trivalent phospholane ester, are useful as intermediates for preparing azo-bis-alkyl pentavalent phosphorus compounds which are useful as blowing agents in foamed organic polymer systems such as in foamed methyl methacrylate polymers.

The process and new products obtained by this invention may be summarized by the following illustrative equation:

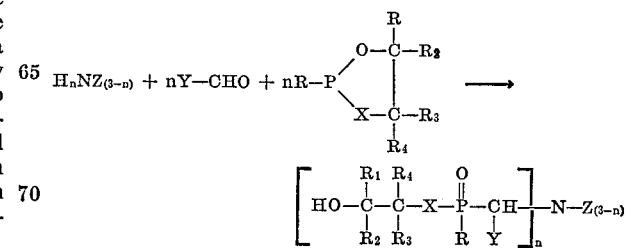

wherein each Z may be hydrogen, or an alkyl radical having from 1 to 10 carbon atoms, hydroxyalkyl radicals having from 2 to 10 carbon atoms, phenyl, with only one Z being phenyl, the other being hydrogen, with two Z radicals taken together with the nitrogen to which they are bonded containing from 2 to 5 methylene carbon atoms completing a ring therewith; Y is either hydrogen, denoting formaldehyde and including polymerized forms thereof, alkyl groups having from 1 to 10 carbon atoms, cycloalkyl groups having from 3 to 6 carbon atoms, phenyl, furyl, and thienyl; R is any of an alkyl, or alkyloxy radical having from 1 to about 10 carbon atoms, a haloalkoxy radical having from 2 to 10 carbon atoms, phenyl, phenoxy, halogenated phenyl and halogenated phenoxy, and each of $R_1$, $R_2$, $R_3$, and $R_4$ is any of hydrogen, an alkyl or haloalkyl radical having from 1 to 6 carbon atoms, and phenyl with not more than one of $R_1$, $R_2$, $R_3$, and $R_4$ being phenyl, said $R_1$, $R_2$, $R_3$, and $R_4$ being selected so as to have not more than about 10 carbon atoms in the phospholane ester structure; X being any of —O—, —S—, —$CH_2$—, or $R_5CH<$ wherein $R_5$ denotes an alkyl radical having from 1 to 2 carbon atoms; and $n$ is an integer of from 1 to 3. The compounds illustrated by this equation and these formulae are the most practical to use and to produce and are not intended to define the limits of the invention. For example, compounds of greater molecular weight could be prepared using dialkylamines or dialkanolamines having more than 10 carbon atoms, or compounds containing unsaturation could be prepared by using amines or aldehydes containing olefinic unsaturation which does not effect the course of the ring opening, water consuming reaction of the invention. From reading this description those in the art will readily be aware of the various types of reactants which could be used. As another example, ketones, especially lower ketones such as acetone and methyl ethyl ketone could be used in place of the aldehyde but the yields of product therewith are not as good, and therefore the use of ketones is not as desirable.

An example of preferred reactants which are used and a product which is obtained by this invention is the reaction of 2-(2-chloroethoxy) - 1,3,2 - dioxaphospholane, acetaldehyde, and diethanolamine to obtain 2-chloroethyl 2-hydroxyethyl 1-[N,N-bis(2-hydroxyethyl)amino] ethylphosphonate as a dry product in a one step process.

Suitable primary and secondary amines which can be used, besides ammonia, as the alkylamines and dialkylamines, e.g. methylamine, ethylamine, propylamine, butylamine, octylamine, decylamine, dimethylamine, diethylamine, ethylmethylamine, methyldecylamine, the hydroxyalkylamines and bis(hydroxyalkyl)amines, e.g., 2-hydroxyethylamine, 3-hydroxypropylamine, 2-hydroxypropylamine, 4-hydroxybutylamine, 8-hydroxyoctylamine, diethanolamine, dipropanolamine, ethanolpropanolamine, dibutanolamine, and dinonanolamine, as well as mixed alkyl and hydroxyalkyl amines such as methylethanolamine, and ethylbutanolamine, and cyclic amines such as aniline, 2-furanamine, aziridine(ethyleneimine), azetidine, pyrrolidine, piperidene, etc.

Suitable aldehydes which may be used include formaldehyde and oligomeric and polymeric forms thereof such as trioxymethylene and paraformaldehyde, acetaldehyde, propionaldehyde, pentanaldehyde, octanaldehyde, the cycloalkanaldehydes such as cyclopropionaldehyde, cyclobutanaldehyde, cyclohexanaldehyde, furfural, thiophenecarboxaldehyde, etc. The presence of cyano, alkoxy, carboalkoxy, and alkylthio substituents in the aldehyde has no effect on the course of the reaction; hence there may be employed such substituted aldehydes as 3-cyanopropionaldehyde,
3-butoxybutyraldehyde,
4-cyano-2,2-dimethylbutaldehyde,
3-isopropoxypropionaldehyde,
3-(ethylthio)-3-methylbutyraldehyde,
2-methyl-3-fluoropropionaldehyde, succinaldehydic acid methyl ester and ethyl 4-formylbutyrate.

As indicated above, the presently useful aldehyde may also be heterocyclic aldehydes such as 2- or 3-furaldehyde,
5-acetamido-2-furaldehyde,
5-bromo- or chloro-2-furaldehyde,
5-methyl-2-furaldehyde,
4-ethoxy-2-furaldehyde,
5-propylthio-2-furaldehyde,
2- or 3-thiophenecarboxaldehyde,
3,5-dimethyl-2-thiophenecarboxaldehyde,
2,5-dichlorothiophenecarboxaldehyde,
2,5-diethyl-3-thiophenecarboxaldehyde, etc.

The cyclic trivalent phosphorus phospholane esters which may be used include the 1,3,2-dioxaphospholane, 1,2-oxaphospholane, and 1-oxa-3-thia-1,3,2-phospholane esters substituted on the 2-position (the phosphorus atom of the ring) with alkyloxy, alkyl, aryloxy or aryl groups. Examples include the 2-alkoxy-1,3,2-dioxaphospholanes octyloxy- and 2-decyloxy-1,3,2-dioxaphospholanes, the 2- such as 2-methoxy-, 2-ethoxy-, 2-butoxy-, 2-heptyloxy-, 2-haloalkyloxy-1,3,2-dioxaphospholanes such as 2-(2-chloroethoxy)-1,3,2-dioxaphospholane,
2-(2-bromopropoxy)-1,3,2-dioxaphospholane,
2-(dichlorooctyloxy)-1,3,2-dioxaphospholane,
2-(3-chloropropyloxy)-4-methyl-1,3,2-dioxaphospholane,
2-(2-chloroethoxy)-4-phenyl-1,3,2-dioxaphospholane, and the 2-aryl and 2-haloarylphospholane esters such as 2-phenyl-1,3,2-dioxaphospholane,
2-(3,4-dichlorophenyl)-1,3,2-dioxaphospholane,
2-(4-bromophenyl)-1,3,2-dioxaphospholane,
2-pentachlorophenyl-4-methyl-1,3,2-dioxaphospholane,
2-tolyl-4,5-diethyl-1,3,2-dioxaphospholane,
2-(tribromophenoxy)-4-phenyl-1,3,2-dioxaphospholane,
2-phenoxy-1,3,2-dioxaphospholane, etc.

In the reaction one molar proportion of each of the aldehyde and phospholane ester react with one equivalent amount of the ammonia or primary or secondary amine, i.e., to replace one hydrogen atom bonded to the nitrogen thereof. For example, if ammonia is used, all three of the hydrogens bonded to the nitrogen atom can be replaced by the respective alkylphosphinyl radical derived from one molar proportion of the aldehyde and phospholane ester used. Thus by reacting one molar proportion of ammonia with three molar proportions of acetaldehyde and 2-(2-bromopropoxy)-1,3,2-dioxaphospholane there is obtained N,N,N - tris {1-[(2-bromopropoxy)(2 - hydroxyethoxy)phosphinyl]ethyl} - amine. Another way of naming the same compound is 2-hydroxyethyl 2-bromopropyl 1 - (N,N - bis{[(2-bromopropoxy)(2 - hydroxyethoxy)phosphinyl]ethyl}amino)ethylphosphonate. Also, by reacting 1 molar proportion of each of 2(2-chloroethoxy)-4-phenyl-1,3,2 - dioxaphospholane, 2-furfuraldehyde, and diethanolamine there is obtained 2-chloroethyl 2-hydroxy-2- or 3-phenylethyl 2-[N,N-bis-(2-hydroxyethyl)amino]furylphosphonate, depending upon how the phospholane ring opens. Because of the varying ways the phospholane ring may open when some phospholane ring compounds are used, mixtures of isomers may be obtained as product. A side reaction that sometimes leads to small amounts of impurities when 2-alkoxy- or 2-aryloxyphospholane esters are used is the cleavage of the 2-alkoxy (or aryloxy) group bonded to phosphorus rather than the preferred ring-opening of the phospholane group. These side reactions are usually not detrimental since the mixed products can be used for the same purpose in most applications, e.g., as in the making of flame-retardant polyurethane resins and foams.

The three reactants may be combined simultaneously or in any order of addition in the desired proportions. In some cases it may be desirable to add a small amount of water, acid, or a pentavalent phosphorus-hydrogen compound to aid in initiating the reaction. Thereafter no water, acid or phosphorus-hydrogen compound need be added. Any proton donating acid may be used for this purpose, a few examples being hydrogen chloride, hydrochloric acid, sulfuric acid, formic acid, etc. Dimethyl phosphite [dimethyl hydrogenphosphonate] diethyl phosphite and similar esters are examples of useful pentavalent phosphorus-hydrogen initiators which can be used. The three reactants may be mixed and allowed to stand until the hydroxyalkyl aminoalkyl pentavalent phosphorus compound has formed. Because the reaction may be exothermic, gradual contact of the chosen reactants is recommended in order to obtain smooth reaction. It is recommended that with each initial run, cooling be employed until there appears to be no spontaneous increase in temperature as a consequence of the mixing. In most instances the reaction is mildly exothermic initially. Using the lower alkanecarboxaldehydes, which aldehydes are generally very active, external cooling is usually advantageous. When working with such aldehydes it is generally preferred to gradually add the aldehyde to a mixture of the phospholane ester and the amine reactants with application of external cooling and thorough stirring. When ammonia is used, it may be advantageous to add the ammonia to a mixture of the other two reactants to minimize formation of unreactive ammonia-aldehyde condensation products. Usually it suffices to maintain the reaction temperature at 0° to 60° C. during mixing of the reactants. Completion of the reaction may be assured, if desired, by heating the reaction mixture to a temperature of from about 60° to 100° C. Completion of the reaction can be ascertained by noting cessation of change in viscosity, refractive index, or color of the product.

The following examples illustrate in more detail how the new products can be produced by the process of this invention.

EXAMPLE 1

A 1 liter flask fitted with a thermometer, mechanical stirrer, condenser, and a dropping funnel was charged with 170.5 g. (1.0 mole) of 2-(2-chloroethoxy)-1,3,2-dioxaphospholane and 66.0 g. (1.5 moles) of acetaldehyde. Diethanolamine, 105.0 g. (1.0 mole), was then added dropwise in 0.5 hour (largely at 40 to 42° C. with moderate cooling). The temperature then increased slowly to a maximum of 54° C. The reaction mixture was warmed at 50°–55° C. for 0.5 hour more and then concentrated to 60°/0.5 mm. to remove excess acetaldehyde and to leave as residue 318 g. (theory, 320 g.) of red liquid which was substantially 2-chloroethyl 2-hydroxyethyl 1 - [N,N-bis(2-hydroxyethyl)amino]ethylphosphonate, $n_D^{25}$ 1.4985, having the major phosphorus nuclear magnetic resonance (NMR) peak at $-21.9$ p.p.m. (relative to $H_3PO_4$). The infrared spectrum was also consistent with the desired structure. It analyzed as containing 9.49% phosphorus, 5.08% nitrogen and 15.4% alcoholic hydroxyl as compared with theoretical values of 9.69% phosphorus 4.38% nitrogen and 15.9% hydroxyl.

EXAMPLE 2

A 179 g. (1.05 mole) portion of 2-(2-chloroethoxy)-1,3,2-dioxaphospholane and 46.7 g. (1.06 mole) of acetaldehyde were placed in a 1-liter flask, and 6.0 g. (0.35 mole) of anhydrous ammonia was added with nitrogen. The temperature increased spontaneously to 50° C. in about 0.1 hour, and it was then kept at 45°–50° C. by moderate cooling during most of the ammonia addition (0.5 hour). The reaction mixture was warmed to 60° C. and then concentrated to 65° C./10 mm. to give 220.3 g. (theory is 231.7 g.) of substantially tris-[1-(2-chloroethoxy)(2 - hydroxyethoxy)phosphinylethyl]amine as an orange viscous liquid having the major phosphorus NMR peak at $-28.2$ p.p.m. It contained 7.07% hydroxyl, 14.35% phosphorus, 15.98% chlorine, and 2.30% nitrogen as compared with theoretical values of 7.7% hydroxyl, 14.1% phosphorus, 16.1% chlorine and 2.1% nitrogen.

EXAMPLE 3

A 1472 g. (11.63 moles) portion of 2-chloro-1,3,2-dioxaphospholane was placed in a 3-liter flask fitted with a thermometer, Dry Ice condenser and a gas delivery tube that extended below the liquid surface. A catalytic amount (7.4 g.) of 2-chloroethanol was added and then 525 g. (theory 513 g., 11.63 moles) of ethylene oxide was added in 0.7 hour with cooling at 15–20° C. The reaction mixture was concentrated to 42° C./10 mm. to remove excess ethylene oxide (17 g. distilled) and to leave as residue almost colorless 2-(2-chloroethoxy)-1,3,2-dioxaphospholane.

A 341 g. (2.0 moles) portion of 2-chloroethoxy-1,3,2-dioxaphospholane and 210.2 g. (2.0 moles) of diethanolamine were placed in a 1-liter flask and then 88.1 g. (2.0 moles) of freshly distilled acetaldehyde was added dropwise in 0.5 hour with cooling at 40°–50° C. The resulting reaction mixture was warmed at 60°–65° C. for 0.3 hour to insure complete reaction and then concentrated to 61° C./1.5 mm. to leave as residue 596.5 g. of 2-chloroethyl 2-hydroethyl 1-[N,N-(2-hydroxyethyl)amino]ethylphosphonate having the major phosphorus NMR peak at $-21.2$ p.p.m. It contained 4.57% nitrogen, 10.18% phosphorus and 14.8% hydroxyl as compared to the theoretical of 4.38% nitrogen, 9.69% phosphorus and 15.9% hydroxyl.

EXAMPLE 4

A 1 liter flask was charged with 105 g. (1.0 mole) of diethanolamine and 170.5 g. (1.0 mole) of 2-(2-chloroethoxy)-1,3,2-dioxaphospholane at room temperature. When 36 g. (1.2 mole) of trioxymethylene (formaldehyde trimer) was added, a spontaneous temperature rise resulted, and external cooling was needed to keep the reaction temperature below 40° C. After the heat of reaction diminished, the reaction mixture was warmed at 75°–84° C. for 0.75 hour and then concentrated to 70° C./0.5 mm. to leave 283 g. of substantially 2-chloroethyl 2-hydroxyethyl N,N-bis(2-hydroxyethyl)-methylphosphonate as a yellow viscous liquid having the major phosphorus NMR peak at $-19.0$ p.p.m. and containing 4.94% nitrogen, 10.52% phosphorus, and 17.02% hydroxyl as compared with theoretical values of 4.6% nitrogen, 10.1% phosphorus, and 16.7% hydroxyl.

EXAMPE 5

A 1-liter flask was charged with 133.1 g. (1.0 mole) of diisopropanolamine and 184.5 g. (1.0 mole) of 2-(2-chloroethoxy)-4-methyl - 1,3,2 - dioxaphospholane. The mixture was warmed to 60° C. and 30.0 g. of paraformaldehyde was added in portions in 0.3 hour at 65–71° C. The reaction mixture was warmed at 70°–75° C. for 0.5 hour, allowed to stand overnight, and then concentrated to 80° C./0.2 mm. to obtain as residue 300.5 g. of an isomeric mixture of 2-chloroethyl 2-hydroxypropyl N,N-bis(2-hydroxypropyl)-aminomethylphosphonate and 2-chloroethyl 2-hydroxy-1-methylethyl N,N-bis(2-hydroxpropyl)aminomethylphosphonate having a single phosphorus NMR peak at $-18.1$ p.p.m.

EXAMPLE 6

| | Mole |
|---|---|
| Dipropylamine | 1 |
| Furfuraldehyde | 1 |

The dipropylamine is added to a mixture of the furfuraldehyde and the 2-phenyl-1,3,2-dioxaphospholane and stirred at 40 to 60° C. There is obtained as product 2-hydroxyethyl 2 - (dipropylamino)furyl(phenyl)-phosphinate.

EXAMPLE 7

| | Mole |
|---|---|
| Bis(2-chloroethyl)amine | 1 |
| Thiophenecarboxaldehyde | 1 |
| 2-octyl-4,5-dimethyl-1,3,2-dioxaphospholane | 1 |

The procedure of Example 1 is followed and 2-hydroxy-1-methylpropyl 2-[bis(2-chloroethyl)amino]-thenyl(octyl)phosphinate is obtained as the product.

EXAMPLE 8

| | Mole |
|---|---|
| Aniline | 1 |
| Acetaldehyde | 1 |
| 2-(2-bromohexyloxy)-1,3-oxaphospholane | 1 |

Following the procedure of Example 1 there is obtained as product N,N-bis{1-[(2-bromohexyloxy)-(3-hydroxypropoxy)phosphinyl]ethyl}aniline or 2-bromohexyl 3-hydroxypropyl 1-anilinoethylphosphonate.

EXAMPLE 9

| | Mole |
|---|---|
| Dietanolamine | 1 |
| Cyclobutanecarboxaldehyde | 1 |
| 2-(2-chloroethoxy)-1,3,2-oxathiaphospholane | 1 |

Following the procedure of Example 1 there is obtained as product 2-chloroethyl 2-hydroxyethylthio (diethanolamino)cyclobutylmethylphosphonate.

What is claimed is:
1. Compounds of the formula

wherein R is a haloalkyloxy radical having from 2 to 10 carbon atoms; Y is an alkyl radical having from 1 to 10 carbon atoms; Z is a hydroxyalkyl radical having from 2 to 10 carbon atoms; and $n$ is an integer from one to three.

2. Compounds as described in claim 1 wherein $n$ is 1.
3. Compounds as described in claim 1 wherein $n$ is 3.
4. 2-chloroethyl 2-hydroxyethyl diethanolaminoethylphosphonate.
5. Tris{1-[(2 - chloroethoxy)(2 - hydroxyethyl)phosphinyl]ethyl}amine.
6. A process comprising reacting (a) a compound of the formula $$H_n—N—Z_{(3-n)}$$

wherein each Z is selected from the group consisting of hydrogen, alkyl radicals having from 1 to 10 carbon atoms, hydroxyalkyl having from 2 to 10 carbon atoms, phenyl, with only one Z being phenyl, the other being hydrogen, and with two Z radicals taken together with the nitrogen atom to which they are bonded containing from 2 to 5 methylene carbon atoms completing a ring therewith; (b) an aldehyde of the formula Y—CHO wherein Y is selected from the group consisting of hydrogen, alkyl groups having from 1 to 10 carbon atoms, cycloalkyl groups having from 3 to 6 carbon atoms, furyl, and thienyl, and (c) a trivalent phosphorus ester of the formula

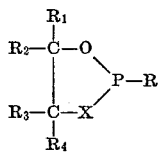

wherein R is selected from the group consisting of alkyl, alkyloxy and haloalkyloxy radicals having from 1 to 10 carbon atoms, and monocyclic aryl hydrocarbon and said aryl hydrocarbon having halogen substituents therein; each of $R_1$, $R_2$, $R_3$, and $R_4$ is a member of the group consisting of hydrogen, alkyl and haloalkyl radicals having from 1 to about 6 carbon atoms, and phenyl, with not more than one of $R_1$, $R_2$, $R_3$, and $R_4$ being phenyl, and X is selected from the group consisting of —O—, —S—, —CH$_2$—, and $R_5$ CH< wherein $R_5$ denotes as alkyl radical having from 1 to 2 carbon atoms to obtain as product of the process a compound of the formula

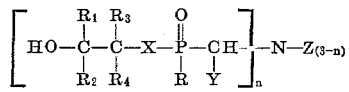

wherein R, $R_1$, $R_2$, $R_3$, $R_4$, X, Y, and Z are as described above and $n$ is an integer of from 1 to 3.

7. A process as described in claim 6 wherein Y is an alkyl group having from 1 to about 10 carbon atoms, R is a haloalkyloxy radical having from 2 to 10 carbon atoms, $n$ is 3, and each of $R_1$, $R_2$, $R_3$, and $R_4$ is hydrogen, and X is —O— to obtain as products of the process a {1 - [(haloalkyloxy)(hydroxyalkyloxy)phosphinyl]alkyl}amine.

8. A process as described in claim 7 wherein ammonia is reacted with acetaldehyde, and 2-(2-chloroethoxy)-1,3,2-dioxaphospholane to obtain tris{1-[(2-chloroethoxy)(2-hydroxyethyl)phosphinyl]ethyl}amine.

9. A process as described in claim 6 wherein each Z is an hydroxyalkyl radical having from 2 to 10 carbon atoms, Y is an alkyl radical having from 1 to 10 carbon atoms, R is a haloalkyloxy radical having from 1 to 10 carbon atoms, $n$ is 1, and of $R_1$, $R_2$, $R_3$, and $R_4$ is hydrogen, X is —O— to obtain as product of the process a haloalkyl hydroxyalkyl 1-dihydroxyalkylaminoalkylphosphonate.

10. A process as described in claim 9 wherein diethanolamine is reacted with acetaldehyde and 2-(2-chloroethoxy)-1,3,2-dioxaphospholane to obtain 2-chloroethyl 2-hydroxyethyl 1-(diethanolamino)ethylphosphonate.

11. A process as described in claim 6 werein each Z is a hydroxyalkyl radical having from 1 to 10 carbon atoms, Y is hydrogen, R is a haloalkyloxy radical having from 1 to 10 carbon atoms, $R_1$ is alkyl having from 1 to 6 carbon atoms, $n$ is 1, and X is —O— to obtain as product a haloalkyl hydroxyalkyl bis(hydroxyalkyl)aminomethylphosphonate.

12. A process as described in claim 11 wherein diisopropanolamine is reacted with paraformaldehyde and 2-(2-chloroethoxy)-4-methyl-1,3,2-dioxaphospholane to obtain 2-chloroethyl 2-hydroxypropyl diisopropanolaminomethylphosphonate.

References Cited

UNITED STATES PATENTS 2,635,112   4/1953   Fields _____ 260—932 XR

CHARLES B. PARKER, Primary Examiner

A. N. SUTTO, Assistant Examiner

U.S. Cl. X.R.

260—926, 2.5, 332.3, 347.2, 347.7, 977, 968, 945, 944, 45.7